(12) United States Patent (10) Patent No.: US 8,662,373 B2
Lukiyanets et al. (45) Date of Patent: Mar. 4, 2014

(54) DEVICE FOR WELDING THE END FACES OF THIN-WALLED JACKETS

(75) Inventors: Sergey V. Lukiyanets, Prag 5-Zlicin (CZ); Nikolay G. Moroz, Mizosov (CZ)

(73) Assignee: Armotech S.R.O., Praha (CZ)

( * ) Notice: Subject to any disclaimer, the term of this patent is extended or adjusted under 35 U.S.C. 154(b) by 370 days.

(21) Appl. No.: 13/059,261

(22) PCT Filed: Aug. 26, 2009

(86) PCT No.: PCT/EP2009/006183
§ 371 (c)(1),
(2), (4) Date: Mar. 3, 2001

(87) PCT Pub. No.: WO2010/022929
PCT Pub. Date: Mar. 4, 2010

(65) Prior Publication Data
US 2013/0200133 A1 Aug. 8, 2013

(30) Foreign Application Priority Data

Aug. 27, 2008 (RU) .................................. 2008134620

(51) Int. Cl.
*B23K 37/00* (2006.01)
*B23K 5/22* (2006.01)

(52) U.S. Cl.
USPC ............................. 228/44.5; 228/5.5; 228/59

(58) Field of Classification Search
USPC ........... 228/212, 213, 5.5, 4.1, 44.3, 44.5, 59; 219/121.58, 158, 160, 161, 521, 777, 219/659, 225, 230
See application file for complete search history.

(56) References Cited

U.S. PATENT DOCUMENTS

| 3,275,794 | A | * | 9/1966 | Dubusker et al. | .......... 219/125.1 |
| 3,761,005 | A | | 9/1973 | Baxter | |
| 4,039,115 | A | * | 8/1977 | Randolph et al. | ............ 228/44.5 |
| 5,535,938 | A | * | 7/1996 | Leduc | ............................ 228/212 |
| 6,840,433 | B2 | * | 1/2005 | Vermaat | ........................ 228/212 |
| 7,398,909 | B2 | * | 7/2008 | Dick | ............................ 228/44.5 |
| 7,866,532 | B1 | * | 1/2011 | Potter et al. | ................. 228/112.1 |
| 8,056,796 | B2 | * | 11/2011 | Simmons | ...................... 228/44.3 |

FOREIGN PATENT DOCUMENTS

| DE | 3937094 A | 5/1990 |
| DE | 4006900 A | 9/1991 |
| DE | 29716233 U | 12/1997 |

* cited by examiner

*Primary Examiner* — Kiley Stoner
*Assistant Examiner* — Carlos Gamino
(74) *Attorney, Agent, or Firm* — Andrew Wilford

(57) ABSTRACT

The invention relates to a device for welding the end faces of thin-walled jackets (12) on a welding plane, said device comprising two cylindrical positioning receiving units (1), which center the jackets (12) to be welded in relation to their outer diameters, both receiving units (1) being located on an alignment base flush with one another and being axially displaceable. A deformable, annular, membrane-type heat exchanger is situated on the exterior of each receiving unit (1), said heat exchanger being formed from a set of sheets (2) consisting of heat-resistant material that are separated from one another. The lower end of the sheets is designed to be in thermal contact with the jacket (12).

8 Claims, 1 Drawing Sheet

DEVICE FOR WELDING THE END FACES OF THIN-WALLED JACKETS

CROSS REFERENCE TO RELATED APPLICATIONS

This application is the US-national stage of PCT application PCT/EP2009/006183, filed 26 Aug. 2009, published 4 Mar. 2010 as WO2010/022929, and claiming the priority of Russian patent application 2008134620 itself filed 27 Aug. 2008.

FIELD OF THE INVENTION

The invention relates to a device for welding the end faces of thin-walled jackets at a welding plane.

The device may be used to produce welded products in particular by full fusion welding in a medium of inert gases with the addition of halogen reagents into the welding zone. The device may in particular be used for welding thin-walled jackets, semi-finished tube products and the like made of stainless steels.

BACKGROUND OF THE INVENTION

To carry out welding of particularly thin-walled products with large cross-sections, the joint edges of the products must be completely congruent with regard both to thickness and to circumference, taking account of concentricity and centering precision of the parts to be welded.

It is likewise generally known that, when full fusion welding jackets or plates, a biaxial stress state of the metal arises in the welding zone, which is the consequence of displacement of the edges to be welded on heating by the moving heat source. In the case of plates which are full fusion welded without an interspace, the edges cannot move unhindered in front of the heat source, and elastic compression of the metal takes place within them, drooping plastic deformation of the metal occurring. During passage of the heat source a comparatively narrow zone of the metal is affected by the displacement, namely that zone heated to an elevated temperature. Reinforcement of the plates therefore exerts virtually no influence on the transverse movement of the edges during welding. On welding cylindrical jackets, apart from the plastic deformation involving axial droop of the metal, a change in the diameter thereof also takes place, which leads to axially symmetrical deformation of the sections to be welded.

Deformation due to uneven heating over the width and length of the weld seam by nature constitutes bending strain. Flexure takes place as a result of the fact that the heated side broadens, while the cold side works against this broadening. To the extent that the width of the heated zone reduces at constant heat source power, the deformations caused by rotation of the sections also reduce. With very narrow heating zones, it may so happen that the jackets to be welded do not exhibit any significant angular deformations.

As a result of the above explanations, the task arises of selecting the optimum dimensions for the zones from which it is necessary to dissipate the heat, and also of producing designs for devices for achieving this object, in order to prevent bulging during welding and to reduce the residual stresses in the structures to be welded.

Methods are known for welding tubes and containers using devices which bring about centering relative to the external diameter (B. E. Paton, Technologija elektri☐eskoj svarki metallov i splavov plavneniem, Moscow, Mašinostroenie, 1974.)

The solutions according to the stated methods using known devices cannot in practice be used when welding thin-walled structures.

As the closest prior art with regard to the object of the invention and the method of achieving the object, a device was selected which comprises cylindrical alignment bushes with a fastening unit that allows centering of tubes on welding and which is known from RU 2 303739 C1.

A disadvantage of this solution is that it cannot be applied in the case of welding thin-walled jacket structures.

OBJECT OF THE INVENTION

The object of the invention is to provide a structurally simple device for performing a fusion welding method for producing annular joints for thin-walled jackets to produce various closed containers.

SUMMARY OF THE INVENTION

This object is achieved by a device for welding end faces of thin-walled jackets at a welding plane that comprises two cylindrical positioning holders that center the jackets to be welded with regard to their external diameter, the two holders being arranged flush with one another on an alignment basis and axially displaceably, a deformable, annular, membrane-type heat sink being arranged on the outside of each holder, which heat sink is formed of a set of mutually separated plates of heat-conducting material, the lower end of which is arranged for thermal contact with the jacket.

Using the device according to the invention, the quality of the weld seam may be enhanced, since the structure thereof is dense and fine-grained and no microdefects are present. In addition, mounting of the jackets is simplified.

The fastening unit may take the form of annular springs and a movable stop bush.

Along the axis of the centering alignment bush, the plates of the membrane-type heat sink have a profile in the form of a rocker arm and are attached in an annular groove in the alignment bush by means of a resilient annular spring in such a way that they may be rotated relative to their outer surface.

The lower ends of the plates of the membrane-type heat sink comprise lips on the weld face side that are pressed against one another and are tensioned by means of a resilient annular spring, wherein they form, together with the stop bush, a structure in the form of pincers.

On the weld face side, the diameter of the inner surface of the annular membrane-type heat sink that is formed by the lips of the plates, is equal to the external diameter of the thin-walled, cylindrical jackets to be welded.

The plates of the membrane-type heat sink are of the same width over their entire length.

The end face of the pincers that is formed by the ends of the plates of the membrane-type heat sink on the weld face side, is shifted relative to the end face toward the weld face side, i.e. it projects here beyond the end face of the centering alignment bush by a distance which is equal to 5 to 10 times the thickness of the parts to be welded.

Each positioning holder is provided with a mobile stop bush with an inner conical surface, wherein the tip of this cone is directed toward the side of the opposing weld face, wherein this surface surrounds the ends of the plates of the membrane-type heat sink, wherein axial displacement of the stop bush is possible relative to the cylindrical, thin-walled metallic jackets to be welded.

SUMMARY OF THE INVENTION

Figure 1:
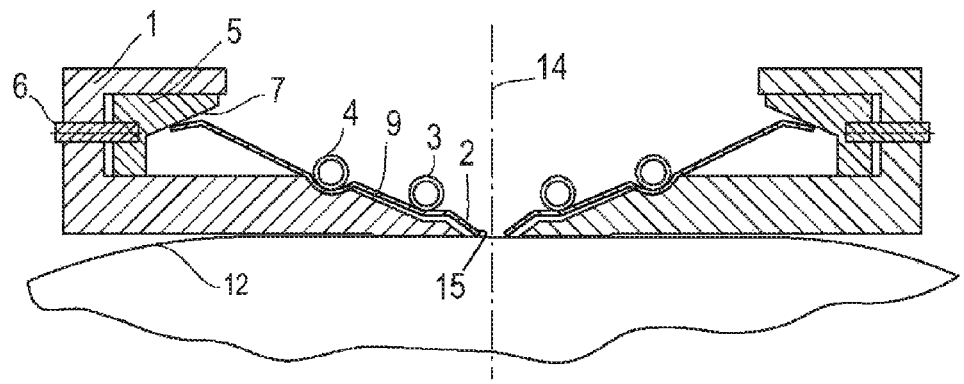
FIG. 1 shows a cross-section of a device according to the invention in a welding zone.

The structure of the device, which is shown in cross-section in FIG. 1, comprises two positioning holders 1 that are constructed in the form of cylindrical profile alignment bushes and center cylindrical jackets 12 to be welded in accordance with their external diameter. The two positioning holders 1 shown in FIG. 1 are of identical construction and are arranged axially relative to one another in such a way that heat dissipating lips 15 of plates 2 arranged thereon face one another. Between them there extends a vertical welding plane 14 in which lie the end faces to be welded together of the jackets 12.

In FIG. 1 the reference numerals are only indicated for the left-hand device, since the device in the right-hand part of FIG. 1 is a mirror image of the left-hand one.

The cross-section of the positioning holder 1 is U-shaped overall, with a longer leg and a shorter leg that are connected by a web. The longer leg extends parallel to the center axis of the holder and forms the inner part of the holder 1. On the left-hand end face the longer leg develops into a vertical web joined at a spacing from the longer leg by the shorter leg that likewise extends parallel to the center axis in the direction of the other holder 1 and thus forms the outer part of the section of the holder 1.

Profile plates 2 are pressed against the outer surfaces 9 of the longer legs of the holders 1 by respective annular springs 4. The points at which the plates 2 are pressed by the respective annular springs 4 onto the respective long legs forms a bearing point about which the plates 2 may be pivoted in the manner of a rocker arm. The portion of the plates 2 extending from the annular spring 4 to the welding plane 14 is arranged at a slight distance from the long leg. For the lower ends of the plates 2 to fit closely to the welding plane 14, the plates 2 are also pressed between the respective annular springs 4 and the ends of the respective holders 1 closer to the welding plane by respective annular springs 3. In the assembled state, the plates 2 together form an annular, readily deformable membrane-type heat sink.

On the side of the upper, free ends of the plates 2, a stop bush 5 movable parallel to the center axis and having an inner frustoconical surface 7 is provided in the holder 1, the tip of the cone being directed toward the welding plane 14. The oblique portion of the cone engages with the free upper ends of the plates 2. The stop bush 5 and the membrane-type heat sink composed of the plates 2 thus form a pincer structure in which on the welding plane 14 side the diameter of the inner surface formed by the lower ends or lips 15 of the plates 2 is equal to the external diameter of the thin-walled, cylindrical jackets 12 to be welded. Adjusters 6 are provided to displace the mobile stop bushes 5 in the holder 1. Each mobile stop bush 5 is displaced in a recess that is formed between the short and the long leg. The adjusters 6 are attached at one end to the stop bush 5, while their other ends pass through the web of the end face of the holder 1 in a direction parallel to the axis of the cylindrical holder and may be displaced therein.

The device functions as follows. The device is mounted on a workbench (not shown) that allows rotary motion. The two holders 1 are then centered in alignment both with the axes and with the inner centering surfaces of the alignment bushes, the two holders 1 being aligned in such a way that the lips 15 of the plates 2 are directed toward one another, as illustrated in FIG. 1. A jacket 12 to be welded is inserted into each holder 1. By displacing the stop bush 5 in the holder 1 toward the welding plane 14 side, the plates 2 of the membrane-type heat sink are pivoted about the bearing point under the annular spring 4 and opened against the force of the annular spring 3 and are no obstacle to longitudinal displacement of the jackets 12 to be welded. Once the workpieces have been thus installed, they are placed against one another at the welding plane 14, until the end faces to be welded are in full contact. The holder 1 is fixed in this position. By displacing the stop bush 5 and/or the annular spring 3 sideways away from the weld face 14, in each of the two holders 1 the membrane-type heat sink is brought into contact at the previously determined points with the workpieces to be welded. The contact area (the heat dissipation zone) is here defined by the width and shape of the mobile plates 2.

Figure 2:
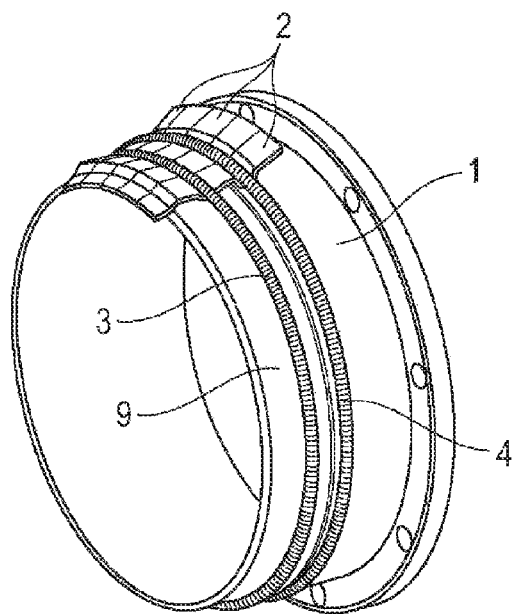
FIG. 2 is a perspective, partially sectional view of an example of the arrangement of plates of a membrane-type heat sink in a holder.

FIG. 2 is a perspective, partially sectional view of the inner part of the holder 1 where only some of the profile plates 2 are provided on the surface thereof. For the sake of clarity, only some of the plates 2 are shown here, likewise only the inner part the holder 1. The profile plates 2 are of resilient construction and may be bent toward the axis of the holder 1 and away therefrom. The plates 2 are held by means of the springs 3 and 4 against the outside 9 of the inner part of the holder 1. In this respect the end face of the membrane-type heat sink, which is formed by the lower ends of the plates 2, projects at a distance of the order of 5 to 10 times the thickness of the jackets to be welded outward in front of the end face of the corresponding holder 1. The wall thickness of the jacket may for example be between 0.1 mm and 1 mm. Accordingly, the plates 2 may project beyond the end face of the holder 1, for a thickness of 0.1 mm, by 0.5 to 1 mm, for a thickness of 0.5 mm, by 2.5 to 5 mm and, for a thickness of 1 mm, by 5 to 10 mm.

When a mobile heat source is switched on, a given zone of the metal is not normally heated axially symmetrically in the jackets to be welded, and the jackets themselves begin to deform axially asymmetrically. The shape of the jacket deformed during heating becomes unround, i.e. in the locally heated zone the curvature of the jacket is less than in the unaffected zone. Because, In the device according to the invention, the membrane-type heat sink is arranged at some distance from the welding plane 14, it removes heat from the material to be welded and prevents large areas thereof from expanding. Because of the mobility of each plate 2 in the contact zone, the heat sink prevents resultant axially asymmetrical deformation of the jackets 12 to be welded and does not cause any additional disruption, but instead allows heat removal only from the zone of the material to be welded.

The functional purpose of the heat sink lies in limiting the zone of heat diffusion to the two sides of the axis of the jackets to be welded from their junction point (the weld face). During the welding process, the end faces of the jackets to be welded are heated to the fusion temperature appropriate for the metal of the jacket to be welded (to 1000 EC or more). Due to the thermal conductivity of the material of the jackets to be welded, the heat diffuses out on both sides of the weld seam and brings about heat deformation of these jackets. Since the heat is supplied by a local source, the heat deformation leads to local expansion of the end face of the jacket. To reduce this effect it is necessary to limit the lateral heating zone over the length of the generatrix of the jackets to be welded. According to the invention, this function is also fulfilled by the heat sink being of material of a high thermal capacity, for example copper. In the contact zone of the heat sink, i.e. the plates 2 with the jacket 12 to be welded, the heat diffuses both in the material of the heat sink and over the length of the jacket 12. Because of the different thermal capacities of the materials of the heat sink and the jacket 12 to be welded and because of the considerable difference in the thicknesses thereof (or masses in the contact zone), the majority of the heat is absorbed by the heat sink, and only a residual part of the heat diffuses in the material of the jacket 12 to be welded. In this way, the local heating zone of the jacket 12 and the zone of its locally temperature-determined warpage are also limited. The heat removal in the contact zone of the plates 2 of the membrane-type heat sink and the jackets 12 to be welded takes place, as mentioned above, as a result of the high thermal capacity or high thermal conductivity of the material of the plates and as a result of natural convection cooling through air flowing around the mobile plates 2 of the heat sink that are spaced by a gap from the alignment bushes. For additional cooling of the plates 2 of the heat sink, a solution may be applied in which the upper ends of the plates 2, which are not in contact with the jackets 12 to be welded, adjoin the mobile stop bush 5 over a specific length and come into contact with a cooling device (not shown) that is cooled for example by cold water.

Application of this solution allows the fusion welding method for joining thin-walled jackets to performed to a sufficiently high quality.

Use of the device according to the invention offers a real possibility of achieving welding structures of the closed container type in the form of thin-walled closed liner jackets. Application of the solution according to the invention has been tested on examples involving the welding of jackets with a wall thickness of 0.5 mm and diameters of 213 and 322 mm. Manufacture and testing of these thin-walled jackets, which were produced using the method according to the invention, confirmed their high reliability and effectiveness.

INDUSTRIAL APPLICABILITY

The solution according to the invention finds widespread application in the welding of thin-walled tubes, receivers, expansion tanks, flasks and other products in various industrial sectors.

The invention claimed is:

1. A device for welding end faces of thin-walled jackets at a welding plane, the device comprising:
    two cylindrical positioning holders that are displaceable along an axis, that center the jackets to be welded, and that are positioned coaxially and flush with one another;
    a respective deformable, annular, membrane-type heat sink on the outside of each holder, each heat sink being formed of a set of separate plates of heat-conducting material each having a lower end in thermal contact with the respective jacket;
    a respective annular spring surrounding each of the heat sinks; and
    respective mobile stop bushes in contact with upper ends of the plates.

2. The device according to claim 1, wherein the plates have lower ends set at a spacing from an outer surface of the cylindrical holder.

3. The device according to claim 1, wherein the axial lengths of the plates of the membrane-type heat sinks have identical widths over the entire axial lengths.

4. The device according to claim 1, wherein confronting inner ends of the membrane-type heat sinks that are formed by the lower ends of the plates are separated by an axial spacing equal to 5 to 10 times the thickness of the jackets to be welded.

5. The device according to claim 1, wherein each mobile stop bush has an inner conical surface in contact with the upper ends of the plates, and each stop bush is displaceable parallel to the axis of the respective holder.

6. A device for welding end faces of thin-walled jackets at a welding plane, the device comprising:
    two cylindrical positioning holders that are displaceable along an axis, that center the jackets to be welded, and that are positioned coaxially and flush with one another;
    a respective deformable, annular, membrane-type heat sink on the outside of each holder, each heat sink being formed of a set of separate plates of heat-conducting material each having a lower end in thermal contact with the respective jacket, the plates of the heat sink having profiles in the form of a rocker arm along the axis of the holder; and
    respective annular springs pressing the sets of plates in respective annular transverse grooves of the holders.

7. A device for welding end faces of thin-walled jackets at a welding plane, the device comprising:
    two cylindrical positioning holders that are displaceable along an axis, that center the jackets to be welded, and that are positioned coaxially and flush with one another;
    a deformable, annular, membrane-type heat sink on the outside of each holder, each heat sink being formed of a set of separate plates of heat-conducting material each having a lower end in thermal contact with the respective jacket, the lower ends of the plates of the membrane-type heat sink forming lips toward the welding plane;
    a respective movable stop bush engaging an upper end of each of the plates; and
    respective resilient annular springs that press the lips toward one another such that the lips form pincer structures together with the stop bushes of the holders.

8. The device according to claim 7, wherein, at the welding plane, a diameter of the inner surface of the annular membrane-type heat sink formed by the lips of the plates, is equal to an outside diameter of the thin-walled, cylindrical jackets to be welded.

* * * * *